United States Patent [19]

Nagao et al.

[11] 4,097,074
[45] Jun. 27, 1978

[54] PIPE JOINT CONSTRUCTION

[75] Inventors: Shozo Nagao; Junkichi Iwamatsu; Hiroshi Kitsukawa; Kozo Nishizaki; Yuichi Watanabe; Yasunori Okamoto, all of Amagasaki, Japan

[73] Assignee: Kubota, Ltd., Osaka, Japan

[21] Appl. No.: 799,329

[22] Filed: May 23, 1977

[30] Foreign Application Priority Data

Dec. 8, 1976 Japan .................................. 51-148067
Jan. 13, 1977 Japan .................................... 52-3330

[51] Int. Cl.² .............................................. F16L 21/08
[52] U.S. Cl. ........................................ 285/231; 285/55;
285/321; 277/DIG. 2
[58] Field of Search ............... 285/231, 230, 321, 345;
277/DIG. 2

[56] References Cited

U.S. PATENT DOCUMENTS

| 3,272,538 | 9/1966 | Bergstrom | 285/231 |
| 3,606,393 | 9/1971 | Huntsinger et al. | 285/321 X |
| 3,637,239 | 1/1972 | Daniel | 285/321 X |
| 3,684,320 | 8/1972 | Platzer et al. | 285/374 |
| 3,712,648 | 1/1973 | Clifford | 285/321 |
| 3,884,510 | 5/1975 | Bram | 285/321 X |
| 3,899,183 | 8/1975 | Wild et al. | 285/231 X |
| 3,941,410 | 3/1976 | Miyaoka | 285/321 |

FOREIGN PATENT DOCUMENTS

| 468,064 | 9/1950 | Canada | 285/345 |
| 226,246 | 1/1960 | Australia | 285/231 |
| 2,205,000 | 8/1973 | Germany | 285/321 |
| 1,247,087 | 10/1967 | Germany | 285/321 |

Primary Examiner—Thomas F. Callaghan
Attorney, Agent, or Firm—Joseph W. Farley

[57] ABSTRACT

A slip-on type pipe joint construction wherein an annular sealing rubber packing is fitted in an annular recess formed in the inner peripheral surface of the socket of a pipe and the spigot end of another pipe is inserted in the socket, whereby the pipes are connected together. The shapes and sizes of the packing and annular recess are controlled so as to assure firm connection without the danger of the packing dragged during insertion of the spigot even in the case of large and medium diameter pipes. Further, in some cases a split lock ring engageable with a projection on the inner peripheral surface of the socket is fitted in an annular groove in the outer peripheral surface of the spigot so as to prevent slipping-off of the spigot.

8 Claims, 10 Drawing Figures

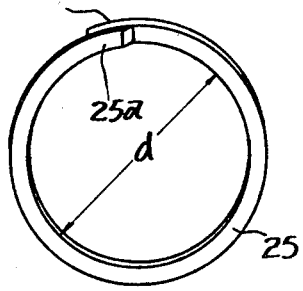
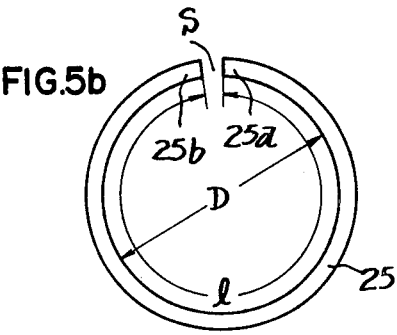
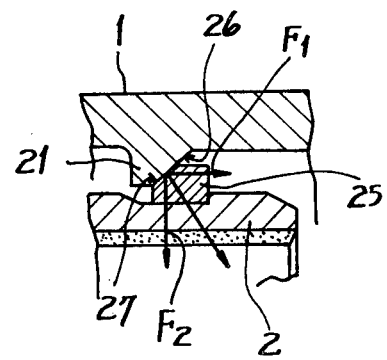
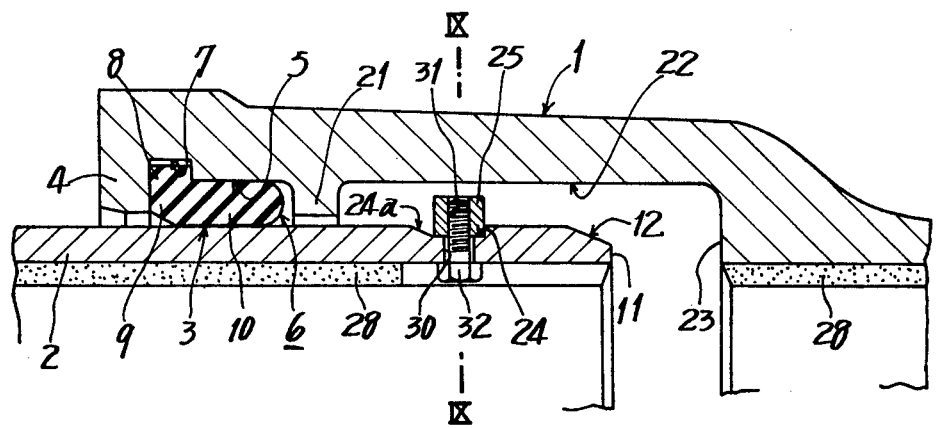

PIPE JOINT CONSTRUCTION

The present invention relates to a slip-on type pipe joint construction wherein an annular sealing packing is fitted in an annular recess formed in the inner peripheral surface of the socket of a pipe and the spigot of another pipe is inserted in said socket, whereby the pipes are connected together. More particularly, it relates to a slip-on type pipe joint construction which ensures easy insertion of the spigot and firm connection of pipes even in the case of large and medium diameter pipes.

A slip-on type pipe joint is simple in construction and has high sealing performance due to its self-sealing function. However, when a slip-on type pipe joint construction is applied to large and medium diameter pipes, there will be the danger of the sealing packing being dragged upon insertion of the spigot unless careful attention is paid to the mounting of the sealing packing, such dragging making it impossible to achieve firm connection. For this reason, slip-on type pipe joints have heretofore not been practically used in large and medium diameter pipes and their applications have been limited to small diameter pipes.

The principal object of the present invention is to eliminate the disadvantages described above by controlling the shapes and sizes of the socket and sealing packing so as to enable such slip-on type pipe joints to be applied to large and medium diameter pipes while retaining their superior sealing function.

The present invention provides a slip-on type pipe joint construction comprising a spigot having a taper surface on the outer periphery at the front end; a socket having a projection on the inner periphery at the open end adapted to be loosely fitted over said spigot, an annular groove disposed adjacent the inner side of said projection and a packing seat formed adjacent the inner side of said annular groove, and a packing having a back-up portion with a fitting portion projecting from its outer periphery for fitting in said annular groove and a seal portion adapted to be interposed in squeezed condition between said packing seat and the outer peripheral surface of the spigot, the inner peripheral surface of said packing tapering from the end edge of said back-up portion toward the seal portion, said pipe joint construction being characterized in that the inner diameter of the packing seat is smaller, preferably 1~6% smaller, than the outer diameter of the packing seal portion, the depth of the annular groove from the packing seat is equal to or greater than the projecting height of the fitting portion, the angle between the packing seat and the lateral surface of the annular groove is equal to or smaller than the angle between the lateral surface of the fitting portion and the outer peripheral surface of the seal portion, and the radial distance between the packing seat and the inner peripheral surface of the projection is equal to or greater than the radial distance between the maximum diameter edge of the inner peripheral surface of the packing and the outer peripheral surface of the seal portion.

In applying this pipe joint construction to a buried pipe line, there will be no trouble if the ground is firm, but if it is soft there will be the danger of the connections between pipes being destroyed owing to subsidence of ground since slipping off can easily take place as the reverse of the fact that insertion of the spigot is easy. Further, in the case of large and medium diameter pipes, the high momentum of the fluid within the pipe causes the danger of an extractive force acting on a pipe joint at a bend, destroying the connection.

Another object of the invention is to provide a slip-on type pipe joint construction ensuring that the connection will not be destroyed even if an extractive force acts thereon.

To this end, the invention provides a pipe joint construction including a second projection directed toward the axis and formed on the inner side of the packing seat of the socket, a split lock ring engageable with said second projection and fitted in an annular groove in the outer peripheral surface of the spigot, and means assuring firm engagement between said split lock ring and said annular groove.

Other numerous features and effects of the invention will be readily understood from the following description of various embodiments thereof given with reference to the accompanying drawings.

DESCRIPTION OF THE DRAWINGS

FIGS. 5a and 5b are front views of a split lock ring used in the pipe joint construction of FIG. 4, illustrating conditions it assumes before and after it is fitted, respectively;

FIG. 6 is a fragmentary sectional view showing a condition assumed when a second projection on a socket engages with the split lock ring in the pipe joint construction of FIG. 4;

FIG. 7 is a longitudinal sectional view of a third embodiment of the invention;

Figure 2:
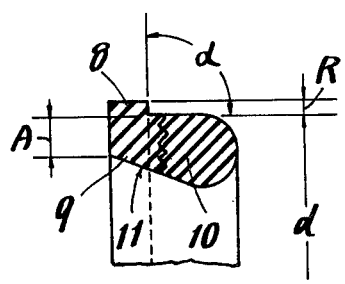
FIG. 2 is a sectional view showing the shape of a rubber packing in non-fitted condition used in the pipe joint construction of FIG. 1.
Figure 3:
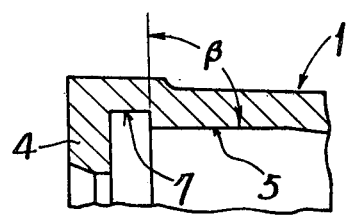
FIG. 3 is a longitudinal section showing a portion of a socket with no packing received therein in the pipe joint construction of FIG. 1.

A first embodiment of the invention will be described with reference to FIGS. 1 through 3.

Figure 1:
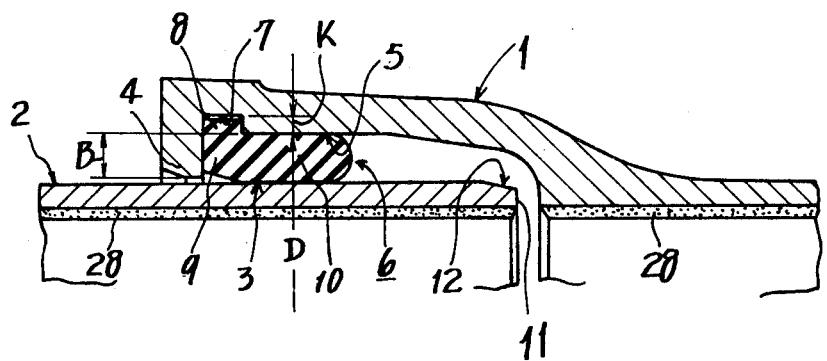
FIG. 1 is a longitudinal sectional view of a pipe joint construction according to a first embodiment of the present invention.

Generally, a slip-on type pipe joint, as shown in FIG. 1, comprises a socket 1, spigot 2 and a rubber packing 3. In this embodiment, the inner periphery of the open end of the socket 1 is formed with a projection 4 adapted to be loosely fitted on the outer periphery of the spigot with a clearance which allows easy insertion of the spigot 2. On the inner side of said projection, there is formed a peripheral surface providing a packing seat 5 and a packing receiving annular space 6 which allows the rubber packing 3 to be interposed in squeezed condition between the packing seat 5 and the outer peripheral surface of the spigot 2. Formed between said projection 4 and said packing seat 5 is an annular groove 7, the diameter of the bottom surface thereof being greater than the diameter of said packing seat. On the other hand, said rubber packing 3 comprises a back-up portion 9 made of hard rubber with a fitting portion 8 formed on the outer peripheral surface thereof to be fitted in said annular groove 7, and a seal portion 10 made of soft rubber and adapted to be fitted in said annular space 6 in squeezed condition so as to produce a seal surface pressure by its restoring force, said back-up portion and seal portion being integrally joined together. The inner peripheral surface of said rubber packing 3 is in the form of a taper surface 11 with its diameter gradually decreasing from the end edge of the back-up portion 9 toward the seal portion 10 to provide for the amount by which the seal portion 10 is squeezed. Further, the outer peripheral surface at the front end portion of the spigot 2 is also in the form of a taper surface 12 so that the spigot 2 may be smoothly inserted into the socket 1 having the rubber packing 3 mounted therein while squeezing the seal portion 10 of the packing.

In order to establish a pipe connection, the packing 3 is deformed and in this condition it is passed through the projection 4 at the open end of the socket and received in the annular recess in the socket 1 with the fitting portion 8 fitted in the annular groove 7 and with the outer peripheral surface of the seal portion 10 contacted with the packing seat 5, as described above. Then, as described above, the spigot 2 is inserted into the socket 1 while squeezing the seal portion 10 of the packing 3 thereby establishing the connection shown in FIG. 1. It is the engagement between the fitting portion 8 and the annular groove 7 that performs the function of holding the packing 3 in position against the axial force exerted on the packing 3 during insertion of the spigot 2 and preventing it from being dragged by the spigot 2.

In the connected condition shown in FIG. 1, the force of restoration from the squeezed condition of the seal portion 10 of the rubber packing 3 produces the surface pressure necessary for sealing between the rubber packing 3 and the socket 1 and between the rubber packing 3 and the outer peripheral surface of the spigot 2. Further, when a fluid pressure is produced in the pipe line, since the seal portion 10 is compressed under such fluid pressure, a surface pressure equivalent to the fluid pressure is added to the surface pressure due to the restoring force of the seal portion, so that the overall surface pressure acts on both surfaces to be sealed. Therefore, a surface pressure greater than a fluid pressure can be automatically obtained without pressing the packing from the outside against the fluid pressure. This self-seal effect keeps the system water-tight or gas-tight. On the other hand, it is the back-up portion of the packing 3 itself that prevents the seal portion 10 of the packing 3 from slipping off through the clearance between the socket 1 and the spigot 2 as it deforms under the fluid pressure in the pipe line. Prevention of the whole packing 3 from slipping off owing to the fluid pressure in the pipe line is effected by the projection 4 on the socket 1, and the engagement between the fitting portion 8 and the annular groove 7 contributes to this preventive action.

In such a pipe joint, in order to establish the connection more easily and firmly even in the case of large and medium diameter pipes with their inner diameters greater than 60mm, the present invention proposes that the following conditions be met.

(a) the outer diameter $d$ of the seal portion 10 of the rubber packing should be greater than the diameter $D$ of the packing seat 5 of the socket;

(b) The projecting height R of 11 fitting portion 8 of the packing should not be greater than the depth K of the annular groove 7 of the socket;

(c) The angle $\alpha$ between the outer peripheral surface of the seal portion 10 and the adjacent radial surface of the fitting portion 8 of the rubber packing should not be smaller than the angle $\beta$ between the packing seat 5 of the socket and the lateral surface of the annular groove 7; and (d) The radial distance A between the outer peripheral surface of the seal portion 10 of the rubber packing and the maximum diameter edge of the inner peripheral taper surface of the packing should not be greater than the radial distance B between the packing seat 5 of the socket and the inner peripheral surface of the projection 4.

The above conditions for setting are intended to improve the mounting of the rubber packing 3 with respect to the socket 1 and further assure the prevention of the rubber packing 3 from being dragged owing to the insertion of the spigot 2, and their functions will now be described.

By setting the outer diameter of the seal portion 10 of the rubber packing 3 so that it is greater than the diameter of the packing seat 5 of the socket 1, the packing 3, when mounted in the socket 1, is compressed circumferentially by the amount expressed by compression percentage $C = (d/D - 1) \times 100\%$ and a radial pressing force proportional to the amount of compression of the packing 3 is exerted in the packing with respect to the packing seat 5. It is theoretically clear and experimentally ascertained that the greater the pressing force, the firmer the retention of the rubber packing within the socket against the force of insertion at the time of connection and the less the tendency of the packing to be dragged.

Experimental examples using pipe joints having a nominal diameter of 1000mm are shown in Table 1.

Table 1

| Packing seat diameter D mm | Seal portion outer diameter d mm | Compression percentage C % | Mountability of packing | Force required for insertion of spigot (ton) | Connected condition |
|---|---|---|---|---|---|
| 1087 | 1089.2 | 0.2 | Mounting is possible by manual operation. | >5 | Sometimes bad depending upon conditions for connection. |
| " | 1097.9 | 1 | " | 4.2 | Good |
| " | 1108.7 | 2 | " | 3.3 | " |
| " | 1119.6 | 3 | " | 3.3 | " |
| " | 1130.5 | 4 | Mounting is possible by manual operation but requires some skill. | 3.2 | " |
| " | 1141.4 | 5 | Mounting requires substantial skill and force. Manual mounting is hardly possible. | 3.2 | " |

Table 1-continued

| Packing seat diameter D mm | Seal portion outer diameter d mm | Compression percentage C % | Mountability of packing | Force required for insertion of spigot (ton) | Connected condition |
|---|---|---|---|---|---|
| " | 1152.2 | 6 | requiring the use of a jack. | 3.2 | " |

As is clear from this table, the desirable range of compression percentage is 1~6, that is, 1.01 D ≤ d ≤ 1.06D, and if it is below the lower limit, some unstable factors are involved in connection with performing firm connection at all times while if it is above the upper limit, there are problems about the mountability of the packing.

The necessary compression percentage depends on the dimensional relation between the annular groove 7 of the socket and the fitting portion 8 of the packing, that is, the relation between the depth K of the annular groove and the projecting height R of the fitting portion 8 and between the angles $\beta$ and $\alpha$. Setting said relation to K ≥ R and $\alpha \geq \beta$ makes firm the pressing of the outer peripheral surface of the seal portion 10 of the rubber packing against the packing seat 5 and further enhances the effect of mounting the packing by circumferentially compressing the same. Reversely, in the case of K < R, the back-up portion 9 of the rubber packing 3 acts to raise the seal portion 10 from the packing seat 5, thereby decreasing the pressing force and also in the case of $\alpha < \beta$, the force of the rubber packing 3 tending to restore itself from the compressed mounted condition acts to extract the fitting portion 8 from the annular groove 7, similarly decreasing the pressing force. Thus, when the relation is not set to K≥R and $\alpha \geq \beta$, it is ascertained that the compression percentage has to be set to a particularly large value, as also shown in Table 2.

Table 2

| Packing seat diameter D mm | Seal portion outer diameter d mm | Compression percentage C % | K mm | R mm | K−R mm | $\alpha°$ | $\beta°$ | $\alpha-\beta°$ | Connection |
|---|---|---|---|---|---|---|---|---|---|
| 1081.3 | 1109.3 | 2.6 | 9.7 | 10 | −0.3 | 80 | 90 | − 10 | Bad |
| " | 1131.0 | 4.6 | " | " | −0.3 | " | " | + 10 | Good |
| " | 1121.4 | 3.7 | " | " | −0.3 | 92 | " | + 2 | Good |
| 1093.0 | 1121.4 | 2.6 | 10.5 | " | +0.5 | 92 | " | + 2 | Very good |
| 1081.3 | 1091.7 | 1.0 | 10.5 | 5 | +5.5 | 92 | " | + 2 | Very good |

Further, by setting the radial distance A between the outer peripheral surface of the seal portion 10 of the rubber packing and the maximum diameter edge of the inner peripheral taper surface so that it is not greater than the radial distance B between the packing seat 5 of the socket and the inner peripheral surface of the projection 4 at the front end of the socket, the packing 3 will be mounted so that the inner peripheral edge at the end of the packing on the socket opening side is disposed inside the projection 4 of the socket. Heretofore, it has been considered that there will be no trouble from the standpoint of the joint construction if the inner peripheral edge at the end of the packing on the socket opening side is radially outside the outer peripheral surface of the spigot. However, in actual connecting operation, with the front end of the spigot 2 retained by the socket projection 4, the suitable connecting device is set, followed by insertion of the spigot 2. Therefore, it often occurs that insertion of the spigot 2 is carried out with the socket projection 4 contacted with the outer surface of the spigot 2 particularly on the underside of the pipe. Accordingly, if said inner peripheral edge of the packing is exposed radially inwardly of the socket projection 4, there is the danger of the packing 3 being dragged upon insertion of the spigot 2. In order to avoid this, the relation A ≤ B is established to dispose said inner peripheral edge inside the projection 4, thereby preventing the packing 3 from being dragged upon insertion of the spigot 2.

As is clear from the above description, according to this pipe joint construction, even if it is applied to large and medium diameter pipes, there is no possibility that at the time of joint connection, i.e. insertion of the spigot, the packing is moved, making joint connection impossible. Therefore, slip-on type pipe joints can be practically used as pipe joints for large and medium diameter pipes. Further, the connecting force required for insertion of the spigot can be made relatively small and mounting of the packing in the socket is easy. This contributes to improvement of connecting operation and is highly significant in point of practical use. Further, since movement of the packing is prevented, the depth of the annular groove of the socket can be reduced and the castability and mechinability of the socket can be improved.

A second embodiment of the invention will now be described with reference to FIGS. 4 through 6.

Figure 4:
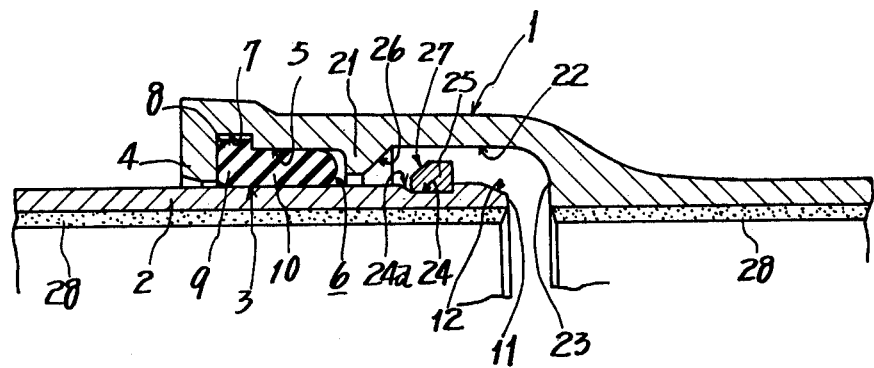
FIG. 4 is a longitudinal sectional view of a second embodiment of the invention.

In FIG. 4, a projection 4, a packing seat 5 and an annular groove 7 in the socket 1, and a rubber packing 3 are the same as those shown in the first embodiment and a description thereof is omitted. A region on the inner side of said packing seat 5 of the socket 1, that is, a region of the inner peripheral surface of the socket disposed inwardly beyond the position where the rubber packing 3 is disposed is formed with a second projection 21 which projects toward the axis of the socket. The inner diameter of said second projection 21 is greater than the inner diameter of the projection 4, thus allowing the spigot 2 to flex to some extent with respect to the socket 1. On the inner side of the second projection 21, there is formed a second wide annular recess 22, and 23 designates the radial step surface of the inner end of said recess 22. On the other hand, the outer peripheral surface of the spigot 2 adjacent the front end thereof is formed with an annular groove 24 in which a split lock ring 25 severed at one place on the circumference thereof is fitted under its own diametrically contractive force. That is, the inner diameter of the split lock ring 25 before it is fitted in the groove 24 is smaller than the bottom surface diameter of the groove 24, and a diametrically contractive force is produced by diametrically expanding said ring when the latter is fitted. The split lock ring 25 is made usually of ductile cast iron, steel or the like. The lateral surface 26 of the second projection 21 toward the innermost part of the socket is engageably opposed to the lateral surface 27 of the split lock ring 25 toward the outermost part of the socket and these two lateral surfaces 26 and 27 are in the form of conical taper surfaces which taper toward the outermost part of the socket. The angles of inclination of these taper surfaces 26 and 27 with the pipe axis are approximately equal to each other and desirably they are 30° ~ 55°.

Since the split lock ring 25 is mounted under its radial contraction urging force based on its radial expansion at the time of fitting, its inner diameter $d$ in pre-mounted condition is smaller than the bottom surface diameter of the annular groove 24, that is, its inner diameter D in mounted condition, as shown in FIGS. 5a and 5b, the stronger the radial contraction urging force obtained and hence the stronger the force with which it is fitted in the annular groove. On the other hand, however, the operation of mounting in the annular groove 24 becomes more difficult. Further, when the split lock ring 25 is mounted in the annular groove 24, it is desirable that the clearance S between the opposite ends 25a and 25b thereof be as small as possible. When the above points are taken into account, it is desirable that the pre-mounted and mounted diameters $d$ and D of the split lock ring 25 be such that $0.95 D \leq d < D$. In order to reduce the clearance S, it is desirable to determine the length $l$ of the split lock ring 25 so that the opposite ends 25a and 25b overlap each other in premounted condition, as shown in FIG. 5.

The operation of connecting the joint of such construction comprises fitting the rubber packing 3 in the socket 1, inserting the split lock ring 25 into the socket 1, inserting the spigot 2 into the socket 1 while squeezing the seal portion 10 of the rubber packing 3, and fitting the split lock ring 25, which is retained in the socket 1, in the annular groove 24 by expanding the inner diameter thereof by using some device.

In addition, in order to prevent the lateral surfaces of the annular groove 24 from hooking the seal portion 10 of the rubber packing 3 upon insertion of the spigot 2, the lateral surface 24a of the annular groove 24 which is farther from the front end 11 of the spigot 2 is in the form of a taper surface and its angle of inclination is approximately equal to that of the taper surface 12 at the front end of the spigot.

In the connected condition shown in FIG. 4, the axial relative movement of the socket 1 and spigot 2 is allowed within the limit defined by the front end 11 of the spigot 2 when bumping against the innermost end step surface 23 of the socket on one hand and on the other hand by engagement between the split lock ring 25 and second projection 21, and separation of the pipes is prevented by engagement between the split lock ring 25 and second projection 21. In this connection, it is to be noted that since the lateral surfaces 27 and 26 with which the split lock ring 25 and second projection 21 engage each other are in the form of taper surfaces having the same angle of inclination, if an extractive force F1 acts between the socket 1 and the spigot 2, there is produced a radial component force F2 which presses the split lock ring 25 against the spigot 2, so that there is no possibility of the split lock ring 25 being extracted from the annular groove 24 by the extractive force F1. Thus, prevention of extraction is assured.

The pipe joint construction in the second embodiment has the arrangement of the first embodiment as the basic arrangement and has an extraction-preventive mechanism added thereto in view of the fact that the first embodiment allows relatively easy extraction of the spigot from the socket and hence there is the danger of extraction taking place particularly in a buried pipe line in soft ground or at a bent pipe portion.

In addition, in FIGS. 1 through 4, the numeral 28 designates a cement mortar lining applied to the inner surface of the pipe.

A third embodiment of the invention will now be described with reference to FIG. 7.

Figure 9:
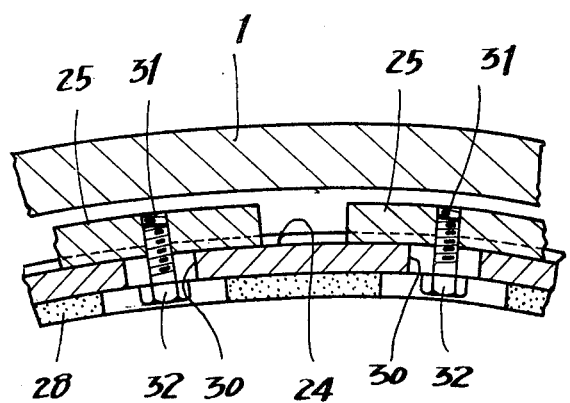
FIG. 9 is a side view in section taken along the line IX—IX of FIGS. 7 and 8.

This embodiment differs from the second embodiment only in the means for preventing the split lock ring 25 from being extracted from the annular groove 24. More particularly, instead of forming the engagement surfaces of the second projection 21 and split lock ring 25 into taper surfaces 26 and 27, the split lock ring 25 is bolted to the spigot 2. In the construction, as shown, the cement mortar lining 28 is left unformed on the front end portion of the spigot or it is stripped off, radial holes 30 extending from the inner surface of the spigot to the bottom surface of the annular groove 24 are formed at a plurality of places on the circumference, threaded holes 31 are formed in the split lock ring 25, and bolts 32 are screwed into said threaded holes 31 through said holes 30 so as to fix the split lock ring 25 in the annular groove 24. In addition, in order to solve the problem about accuracy of machining, as shown in FIG. 9, said holes 30 may be circumferentially elongated holes. Further, the inner surface of the pipe stripped of the cement mortar lining 28 may have a mortar lining or anti-corrosive manually applied thereto after bolting. Properly, said bolts 32 are circumferentially equispaced a 7–11 places including two places near the opposite ends of the split lock ring. Pipe joints with a nominal diameter of 1000mm according to this embodiment were subjected to water pressure extraction tests and bending strength tests. As a result, it was found that the invention performed a satisfactory extraction-preventive function, preventing the split lock ring 25 from being separated from the annular groove 24 when subjected to predetermined extracting forces or to bending loads and that the stresses produced in various parts were below the allowable limits.

Figure 8:
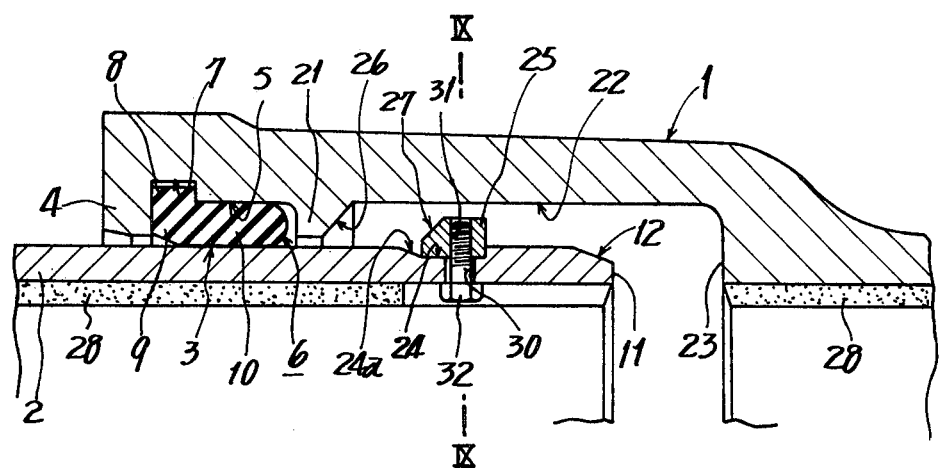
FIG. 8 is a longitudinal sectional view of a fourth embodiment which is a combination of the embodiments shown in FIGS. 4 and 7.

A fourth embodiment shown in FIG. 8 is a combination of the embodiments shown in FIGS. 4 and 7, using bolts 32 and taper surfaces 26 and 27 at the same time.

We claim:

1. In a pipe joint construction comprising a spigot having a taper surface on the outer periphery at the front end, a socket having a first projection on the inner periphery at the open end adapted to be loosely fitted over said spigot, an annular groove disposed adjacent the inner side of said first projection and a packing seat formed adjacent the inner side of said annular groove, and a packing having a back-up portion with a fitting portion projecting from its outer periphery for fittng in said annular groove and a seal portion adapted to be interposed in squeezed condition between said packing seat and the outer peripheral surface of the spigot, the inner peripheral surface of said packing tapering from the end edge of said back-up portion toward the seal portion, the improvement comprising:

(a) said packing seat being formed as an internal cylindrical surface extending from said annular groove inwardly of the socket;

(b) a secnd projection formed on the socket at the inner end of said packing seat and projecting toward the spigot;

(c) a step surface provided on the socket in inwardly spaced relation to said second projection, said step surface being opposed to the front end of the spigot;

(d) an annular seat provided in the outer peripheral surface of the spigot adjacent the front end thereof, a radially contractible lock ring fitted in said annular seat, said lock ring being disposed between said second projection and said step surface and being engageable with said second projection upon relative axial separating movement between the socket and spigot, and fastening means for preventing disengagement of said lock ring from said annular seat;

(e) the socket having an inner peripheral surface extending axially from said second projection towards said step surface, said inner peripheral surface having a diameter such as to provide an annular clearance space with the outer periphral surface of the spigot for passage of said lock ring and such as to provide a radial clearance with the lock ring for relative bending movement between the socket and the spigot;

(f) the axial length of said inner peripheral surface being equal to the sum of the distance between the front end of the spigot and the lateral surface of the lock ring opposed to said second projection and a distance provided for all allowable relative axial movement between the socket and the spigot; and (g) said inner peripheral surface of the packing tapering inwardly of the socket from a maximum diameter of at least equal to the inner diameter of said first projection to a minimum diameter on said packing seal portion which is compressively engaged by the outer periphral surface of the spigot.

2. A pipe joint constuction as set forth in claim 1, wherein:

(a) the outer diameter (d) of said packing seal portion is 1.01 to 1.06 times the inner diameter (D) of the packing seat;

(b) the depth (K) of the annular groove from the packing seat is at least equal to the projecting height (R) of said fitting portion of the packing;

(c) the angle ($\alpha$) between the lateral surface of said fitting portion and the outer peripheral surface of said seal portion is at least equal to the angle ($\beta$) between the packing seat and the lateral surface of the annular groove; and (d) the radial distance (B) between the packing seat and the inner peripheral surface of said first projection is at least equal to the radial distance (A) between the maximum diameter edge of the inner peripheral surface of the packing and the outer peripheral surface of the seal portion.

3. A pipe joint cnstruction as set forth in claim 1, wherein aid fastening means comprises conical taper surfaces formed on the engagement surfaces of the second projection and the lock ring, which surfaces taper toward the outer side of the socket.

4. A pipe joint construction as set forth in claim 3, wherein the angle of inclination of said conical taper surfaces with respect to the pipe axis is 30°–55°.

5. A pipe joint construction as set forth in claim 1, wherein sad fastening means comprises bolts screwed into the lock ring through holes extending from the inner surface of the spigot to the bottom of the annular seat.

6. A pipe joint construction as set forth in claim 5, wherein said holes are circumferentially elongated holes.

7. A pipe joint construction as set forth in claim 1, wherein the lateral surface of said annular seat disposed farther from the front end of the spigot is in the form of a taper surface.

8. A pipe joint construction as set forth in claim 7, wherein said taper surface has substantially the same angle of inclination as the taper surface of the outer periphery of the front end of the spigot.

* * * * *

UNITED STATES PATENT AND TRADEMARK OFFICE
CERTIFICATE OF CORRECTION

PATENT NO. : 4,097,074
DATED : June 27, 1978
INVENTOR(S) : SHOZO NAGAO ET AL

It is certified that error appears in the above-identified patent and that said Letters Patent are hereby corrected as shown below:

Column 4, line 7, "60mm" should read -- 600mm --;

line 12, "11" should read --the --;

In Table 2, following line 36, "+10" should read -- -10 --;

Column 8, line 32, "a" should read -- at --;

Column 9, line 32, delete "all";

Column 10, line 19, "aid" should read -- said --.

Signed and Sealed this

Twenty-sixth Day of December 1978

[SEAL]

Attest:

RUTH C. MASON
*Attesting Officer*

DONALD W. BANNER
*Commissioner of Patents and Trademarks*